(12) United States Patent
Maeda et al.

(10) Patent No.: US 8,330,865 B2
(45) Date of Patent: Dec. 11, 2012

(54) ELECTRONIC APPARATUS, IMAGE DISPLAY SYSTEM AND IMAGE DISPLAY METHOD

(75) Inventors: Shigeru Maeda, Tachikawa (JP); Tomohiro Kanda, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 127 days.

(21) Appl. No.: 13/021,434

(22) Filed: Feb. 4, 2011

(65) Prior Publication Data
US 2011/0199543 A1 Aug. 18, 2011

(30) Foreign Application Priority Data
Feb. 12, 2010 (JP) ................................. 2010-029404

(51) Int. Cl.
*H04N 5/445* (2006.01)
*H04N 9/74* (2006.01)
*H04N 5/44* (2006.01)
*G06F 3/048* (2006.01)
*G09G 5/00* (2006.01)

(52) U.S. Cl. ........ 348/564; 348/581; 348/734; 715/833; 345/661

(58) Field of Classification Search .................. 348/734, 348/601, 561, 581, 589, 569, 564; 345/157, 345/160, 162, 661, 663, 665, 667, 668, 660; 715/800, 815, 833
See application file for complete search history.

(56) References Cited

U.S. PATENT DOCUMENTS

| | | | | |
|---|---|---|---|---|
| 4,816,908 | A * | 3/1989 | Colineau et al. | 348/747 |
| 5,995,083 | A * | 11/1999 | Sato et al. | 345/173 |
| 6,922,816 | B1 * | 7/2005 | Amin et al. | 715/833 |
| 2003/0018427 | A1 * | 1/2003 | Yokota et al. | 701/208 |
| 2007/0057973 | A1 | 3/2007 | Iwamoto | |
| 2007/0285681 | A1 * | 12/2007 | Hayakawa | 358/1.2 |
| 2008/0148147 | A1 * | 6/2008 | Poston et al. | 715/273 |
| 2011/0093890 | A1 * | 4/2011 | Araki et al. | 725/37 |
| 2012/0030613 | A1 * | 2/2012 | Moshiri et al. | 715/784 |

FOREIGN PATENT DOCUMENTS

| | | |
|---|---|---|
| JP | 04-12031 | 1/1992 |
| JP | 08-087376 | 4/1996 |
| JP | 2001-209495 | 8/2001 |
| JP | 2001-209594 | 8/2001 |
| JP | 2007-66054 | 3/2007 |
| JP | 2009-134647 | 6/2009 |

OTHER PUBLICATIONS

Japanese Patent Application No. 2010-029404; Notification of Reasons for Refusal; Mailed Sep. 6, 2011 (with English translation).
Japanese Patent Application No. 2010-029404; Notification of Reasons for Refusal; Mailed Jun. 28, 2011 (with English translation).

* cited by examiner

*Primary Examiner* — Victor Kostak
(74) *Attorney, Agent, or Firm* — Blakely, Sokoloff, Taylor & Zafman LLP

(57) ABSTRACT

According to one embodiment, an electronic apparatus includes: a display configured to display an image; a display magnification changing module configured to change display magnification of the image; a cursor display module configured to display a cursor; a receiver configured to receive a signal indicating a movement direction; and a cursor movement control module configured to move the cursor a first distance in the movement direction when the display is displaying the image with a first display magnification, and move the cursor a second distance that is longer than the first distance in the movement direction when the display is displaying the image with a display magnification that is larger than the first display magnification.

8 Claims, 12 Drawing Sheets

FIG. 7

| RECEIVED SIGNAL | MOVEMENT DISTANCE |
|---|---|
| ONE-SHOT SIGNAL | 10 PIXELS |
| LONG-PRESS SIGNAL (TO THIRD ONE) | 20 PIXELS |
| LONG-PRESS SIGNAL (FROM FOURTH ONE) | 40 PIXELS |
| LAST LONG-PRESS SIGNAL | 10 PIXELS |

ELECTRONIC APPARATUS, IMAGE DISPLAY SYSTEM AND IMAGE DISPLAY METHOD

CROSS REFERENCE TO RELATED APPLICATION(S)

The application is based upon and claims the benefit of priority from Japanese Patent Application No. 2010-029404 filed on Feb. 12, 2010, the entire contents of which are incorporated herein by reference.

BACKGROUND

1. Field

The present invention relates to an electronic apparatus, an image display system, and an image display method. More particularly, the invention relates to an electronic apparatus, an image display system, and an image display method which allow the user to manipulate a cursor easily when the image display magnification is changed.

2. Description of the Related Art

Recent technological developments have made electronic apparatus seamless and, for example, such electronic apparatus as TV (Television) have come to incorporate a browser or the like. Among such electronic apparatus are ones in which a cursor is displayed when the browser is activated and the user makes a manipulation input using the cursor.

In such electronic apparatus as TV receivers, an external manipulation input device such as a remote controller may not incorporate a pointing device such as a touch pad. In such a case, the cursor may be manipulated using four-direction keys or the like.

For example, a Web browser remote control technique is known in which a mouse cursor is moved using four-direction keys.

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

FIG. 7 is a table showing an example relationship between the movement distance of a four-direction key cursor and the four-direction key signal which is received in the four-direction key manipulation mode in the embodiment of the invention;

DETAILED DESCRIPTION

An embodiment of the present invention will be hereinafter described with reference to the drawings.

Figure 1:
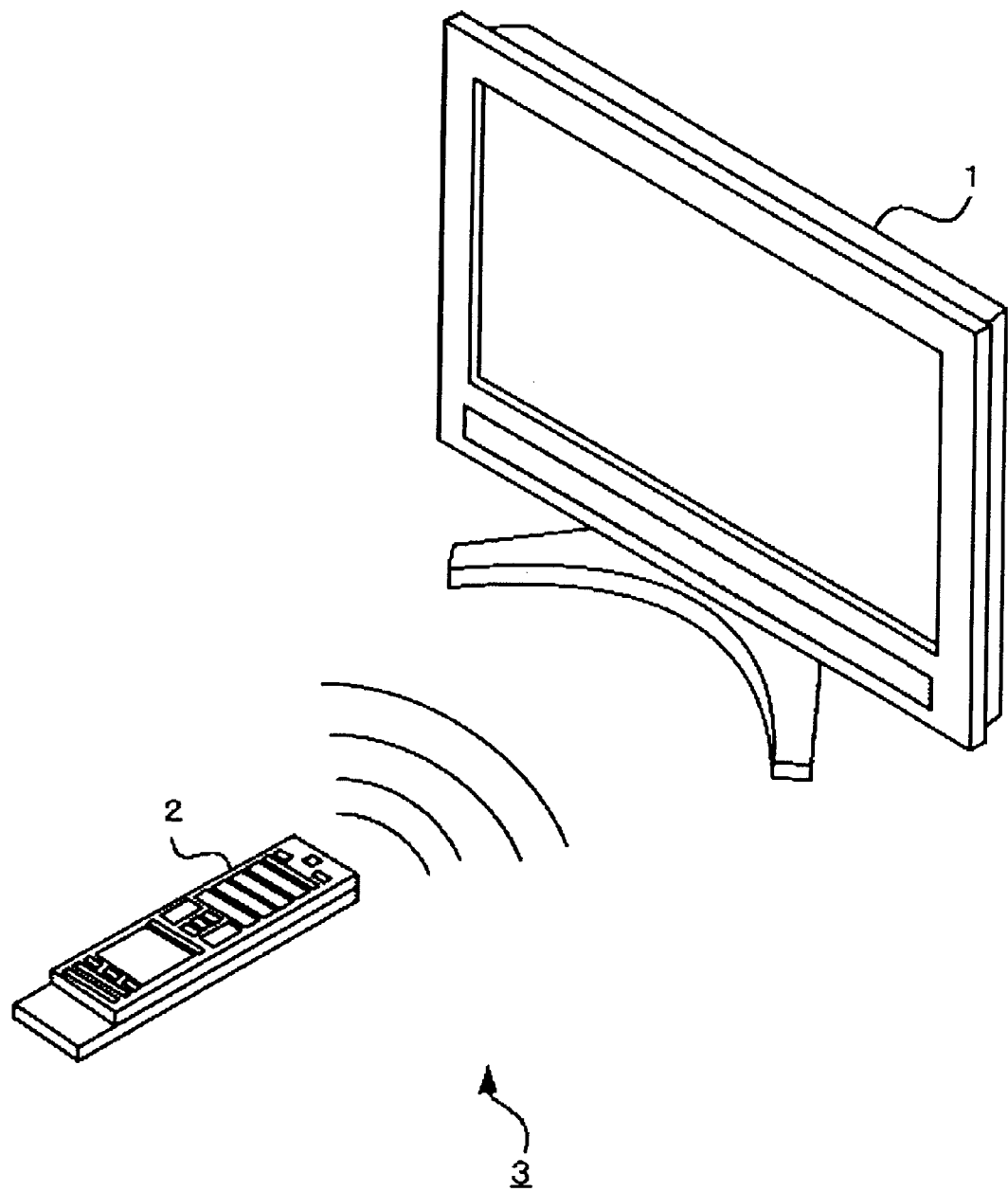
FIG. 1 is a schematic view showing an example image display system according to an embodiment of the present invention.

FIG. 1 is a schematic view showing an example image display system 3 according to the embodiment, which includes a digital television receiver (DTV) 1 and a remote controller 2.

The DTV 1, which is an example electronic apparatus according to the invention, has a function of extracting audio-video information from a broadcast signal of received broadcast waves and outputs it. The DTV 1 is connected to a wide area network (WAN) such as the Internet and can communicate with other apparatus connected to the wide area network. Although the embodiment employs the DTV 1 as an example electronic apparatus according to the invention, the invention is not limited to such a case. Other various examples of the electronic apparatus according to the invention include a set-top box (STB), an HDD (hard disk drive) recorder, a DVD (digital versatile disc) recorder, and a personal computer (PC).

Equipped with plural manipulation switches (keys), the remote controller 2 has a function of sending a signal for manipulation of the DTV 1 when one of those manipulation switches is pressed. An RF (radio frequency) signal or an IR (infrared) signal is usually used as such a signal. However, in the invention, either a wired signal or a wireless signal may be used.

In the image display system 3 which is composed of the DTV 1 and the remote controller 2, the user can cause the DTV 1 to display an image by manipulating the DTV 1 using the remote controller 2.

Next, a detailed configuration of the remote controller 2 will be described.

Figure 2:
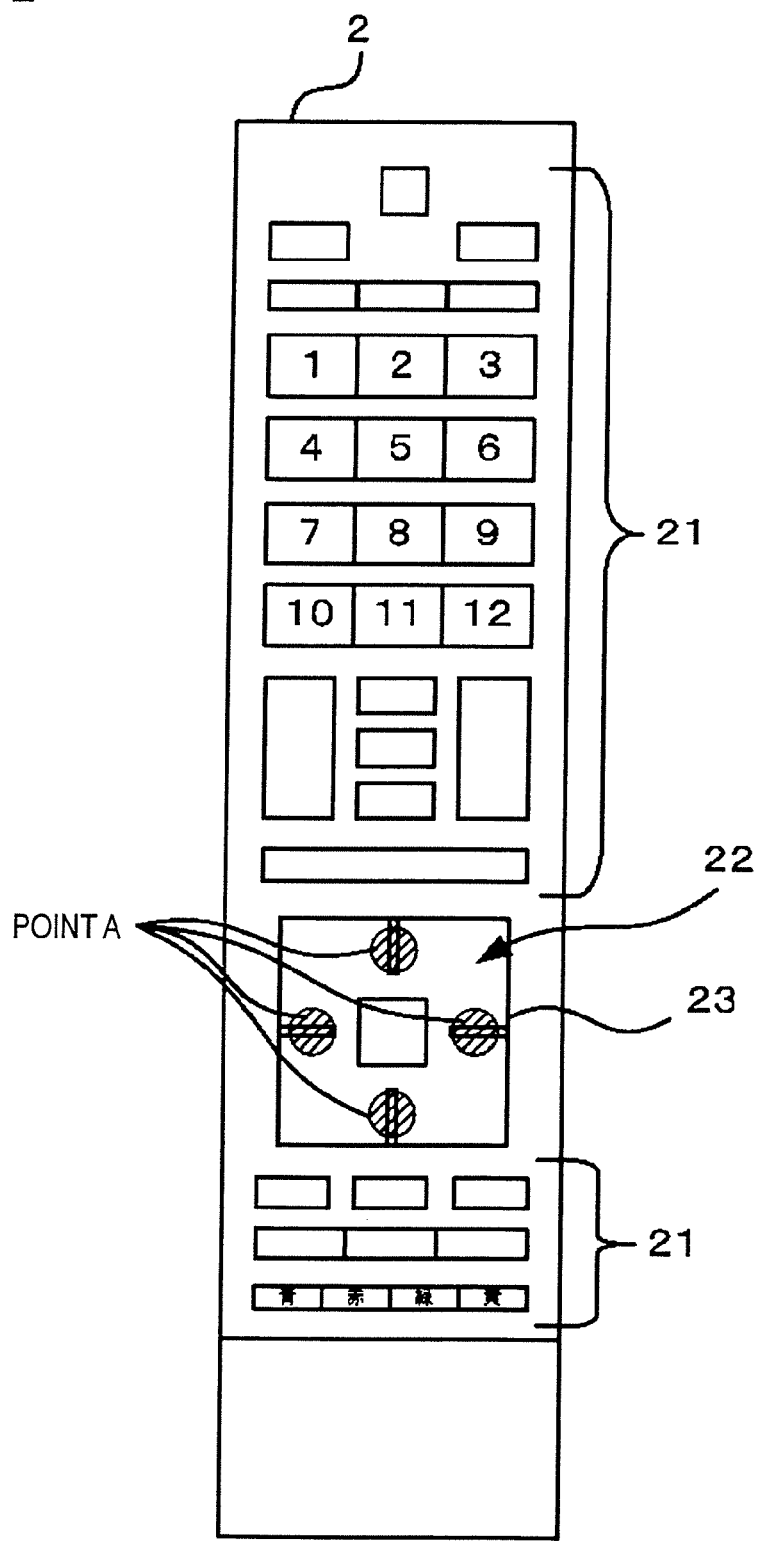
FIG. 2 is an external view showing an example remote controller used in the embodiment of the invention.

FIG. 2 is an external view showing an example remote controller 2 used in the embodiment.

The remote controller 2 is equipped with plural keys (switches) for making a manipulation relating to each of various functions of the DTV 1. In the embodiment, the plural keys are keys 21, a touch pad 22, and four-direction keys 23.

The keys 21 are provided to cause the DTV 1 to perform various functions, and the remote controller 2 sends different manipulation signals in response to pressing of the respective keys 21 by the user. The keys 21 include various keys such as a power key for powering on or off the DTV 1, an input switching key group including an input source switching key for switching between sources of video information to be displayed and keys for selecting games, digital terrestrial broadcasting, BS broadcast, or CS broadcast, a channel character key group for, for example, selecting a channel or inputting characters, a channel switching key for switching between channels, a display mode key for selecting an image display mode, a volume adjustment key for adjusting the sound volume, and color keys having respective colors for realizing various functions of the DTV 1. An enter key for deciding on an item that is located at a position of the cursor displayed on the DTV 1 is also one of the keys 21. In the embodiment, for the sake of convenience of description, the above keys are together referred to as the keys 21, and the touch pad 22 and the four-direction keys 23 will be described separately from the keys 21.

The touch pad 22 has a function of detecting contact of, for example, a finger of the user in the form of a capacitance variation and outputting a detection signal indicating a detection position. The user can manipulate the cursor displayed on the DTV 1 by moving his or her finger on the surface of the touch pad 22.

The four-direction keys 23 are disposed inside the remote controller 2 so as to be opposed to the back surface of the touch pad 22. When the back surface of a portion, pressed down by the user, of the touch pad 22 comes into contact with one of the four-direction keys 23, the four-direction keys 23 detect the pressing and outputs a detection signal. Four-direction keys 23 are disposed inside the remote controller 2 at top, bottom, left, and right positions that correspond to points A shown in FIG. 2, respectively. Consisting of these four switches, the four-direction keys 23 output signals indicating upward, downward, leftward, and rightward directions, respectively.

In the remote controller 2 of the embodiment, the touch pad 22 and the four-direction keys 23 are integrated together (i.e., the touch pad 22 also serves as the four-direction keys 23). When one of the four-direction keys 23 is pressed, the finger of the user is in contact with the touch pad 22 and the touch pad 22 and the four-direction key 23 output respective detection signals.

Although in the remote controller 2 of the embodiment the touch pad 22 and the four-direction keys 23 are located at the same position when viewed from the outside, the invention is not limited to such a case. The touch pad 22 and the four-direction keys 23 may be disposed independently at different positions.

Next, internal configurations of the DTV 1 and the remote controller 2 of the image display system 3 will be described.

Figure 3:
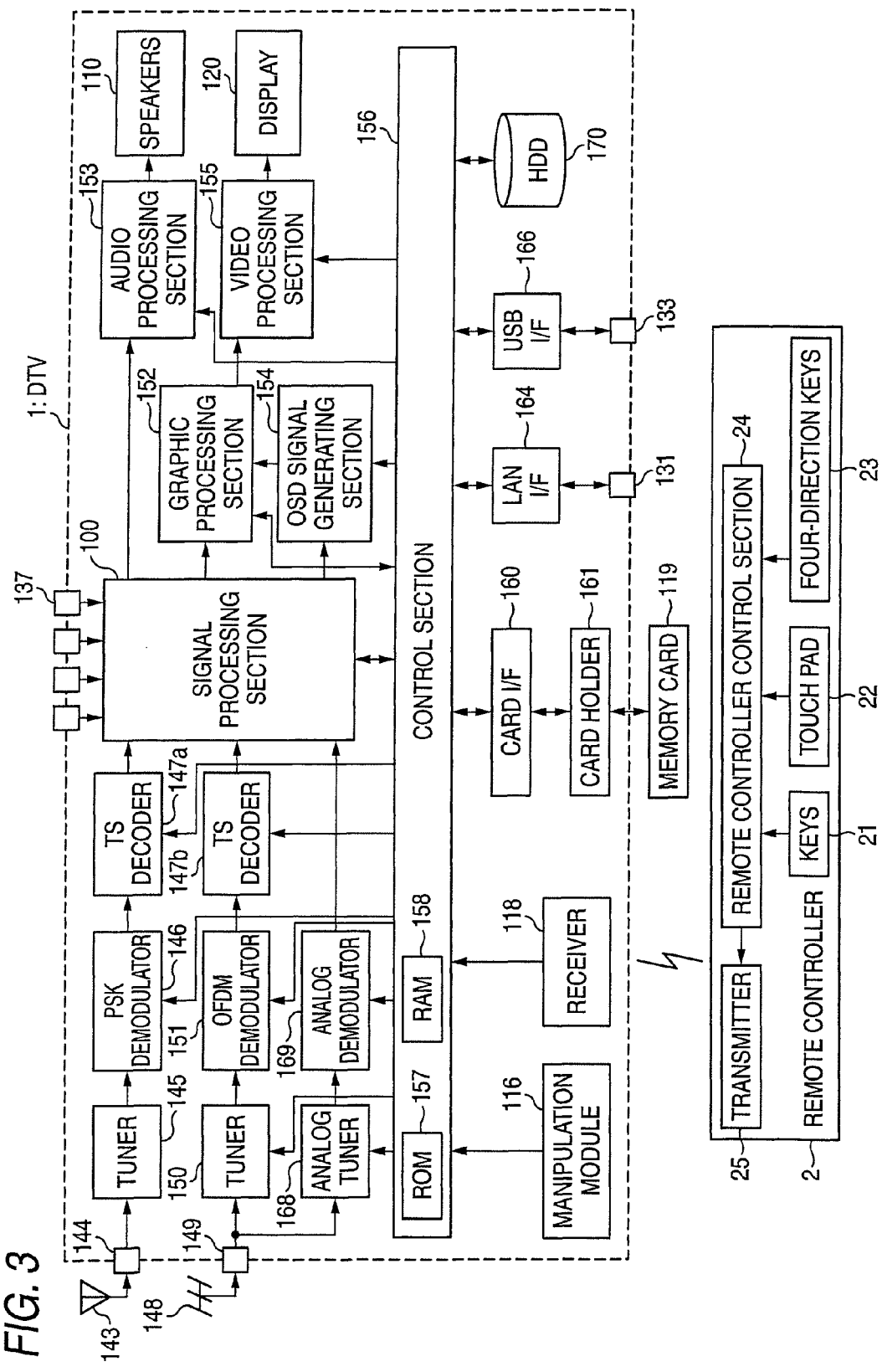
FIG. 3 is a block diagram showing example internal configurations of a DTV and the remote controller according to the embodiment of the invention.

FIG. 3 is a block diagram showing example internal configurations of the DTV 1 and the remote controller 2 according to the embodiment.

First, the DTV 1 will be described.

The DTV 1 is equipped with a control section 156 for controlling operations of the individual sections of the apparatus. The control section 156 incorporates a CPU (central processor) etc. The control section 156 activates a system control program and various processing programs stored in a ROM (read-only memory) 157 in advance in response to a manipulation signal that is input through a manipulation module 116 or transmitted from the remote controller 2 and received by a receiver 118. The control section 156 controls operations of the individual sections of the apparatus according to the activated programs using a RAM (random access memory) 158 as a work memory.

Satellite digital TV broadcast signals received by a BS/CS digital broadcast receiving antenna 143 are supplied to a satellite digital broadcast tuner 145 via an input terminal 144. The tuner 145 tunes in to one of the received digital broadcast signals and supplies the thus-selected digital broadcast signal to a PSK (phase shift keying) demodulator 146. The PSK demodulator 146 demodulates the digital broadcast signal into a transport stream (TS) and supplies the transport stream to a TS decoder 147a. The TS decoder 147a decodes the transport stream into a digital signal containing a digital video signal, a digital audio signal, and a data signal and outputs it to a signal processing section 100. The digital video signal is a digital signal relating to video that can be output by the DTV 1, and the digital audio signal is a digital signal relating to audio that can be output by the DTV 1. The data signal is a digital signal that represents information relating to broadcast programs and contains, for example, program-related information which is information to be used when the DTV 1 generates an electronic program guide (EPG).

Ground-wave digital TV broadcast signals received by a digital terrestrial broadcasting receiving antenna 148 are supplied to a digital terrestrial broadcasting tuner 150 via an input terminal 149. The tuner 150 tunes in to part of the received digital broadcast signals and supplies the thus-selected digital broadcast signals to respective OFDM (orthogonal frequency division multiplexing) demodulators 151. The OFDM demodulators 151 demodulate the digital broadcast signals into transport streams and supplies the transport streams to respective TS decoders 147b. The TS decoders 147b decode the transport streams into digital video signals, digital audio signals, etc. and output those signals to the signal processing section 100. Digital terrestrial broadcasting signals selected by eleven tuners of the tuner 150 can be converted simultaneously by the plural OFDM demodulators 151 and the plural TS decoders 147b into digital signals containing digital video signals, digital audio signals, and data signals, respectively, which are output to the signal processing section 100.

The antenna 148 can also receive ground-wave analog TV broadcast signals. The received ground-wave analog broadcast signals are distributed by a distributor (not shown) and supplied to an analog tuner 168. The analog tuner 168 tunes in to one of the received analog broadcast signals and supplies the thus-selected analog broadcast signal to an analog demodulator 169. The analog demodulator 169 demodulates the analog broadcast signal and outputs a resulting analog broadcast signal to the signal processing section 100. If, for example, a CATV (Community Antenna Television) tuner is connected to the input terminal 149 to which the antenna 148 is connected, the DTV 1 allows the user to view CATV broadcast programs.

The signal processing section 100 performs proper signal processing on a digital signal that is output from the TS decoder 147a, each TS decoder 147b, or the control section 156. More specifically, the signal processing section 100 separates the digital signal into a digital video signal, a digital audio signal, and a data signal. The separated video signal and audio signal are output to a graphic processing section 152 and an audio processing section 153, respectively. Furthermore, the signal processing section 100 converts a broadcast signal that is output from the analog demodulator 169 into a video signal and an audio signal having prescribed digital formats. Those digital video signal and audio signal are output to the graphic processing section 152 and the audio processing section 153, respectively. Still further, the signal processing section 100 performs prescribed digital signal processing on an input signal that is supplied via a line input terminal 137.

An OSD (on-screen display) signal generating section 154 generates, under the control of the control section 156, an OSD signal for display of a UI (user interface) picture or the like. A data signal that is separated from a digital signal by the signal processing section 100 is converted by the OSD signal generating section 154 into an OSD signal having a proper format, which is output to the graphic processing section 152.

The graphic processing section 152 decodes the digital video signal that is output from the signal processing section 100. A decoded video signal is combined with (superimposed on) the OSD signal that is output from the OSD signal generating section 154, and a resulting signal is output to a video processing section 155. The graphic processing section 152 can also select and output the decoded video signal or the OSD signal to the video processing section 155.

The video processing section 155 converts the output signal of the graphic processing section 152 into an analog video signal having such a format as to be displayable by a display 120. The analog video signal is thus displayed on the display 120.

The audio processing section 153 converts the received audio signal into an analog audio signal having such a format as to be reproducible by speakers 110. The analog audio signal is thus output to and reproduced by the speakers 110.

A card holder 161 is connected to the control section 156 via a card interface (I/F) 160. A memory card 119 can be inserted into the cardholder 161. The memory card 119 is a storage medium such as an SD (secure digital) memory card, an MMC (multimedia card), or a CF (compact flash) card. The control section 156 can perform information writing and reading via the card I/F 160 on the memory card 119 that is inserted in the card holder 161.

A LAN terminal 131 is connected to the control section 156 via a LAN I/F 164. The LAN terminal 131 is used as a general LAN-compatible port that complies with Ethernet (registered trademark). In the embodiment, a LAN cable (not shown) is connected to the LAN terminal 131, whereby the control section 156 can communicate with the Internet.

A USB (universal serial bus) terminal 133 is connected to the control section 156 via a USB I/F 166. The USB terminal 133 is used as a general USB-compatible port. A cell phone, a digital camera, a card reader/writer for any of various memory cards, an HDD, a keyboard, etc. are connected to the USB terminal 133 via a hub, for example. The control section 156 can communicate (exchange information) with each device that is connected to the USB terminal 133.

An HDD 170, which is a magnetic storage medium incorporated in the DTV 1, has a function of storing various kinds of information to be held by the DTV 1.

Next, the remote controller 2 will be described.

A detection signal that is output from the keys 21, the touch pad 22, or the four-direction keys 23 is input to a remote controller control section 24. The remote controller control section 24 generates a manipulation signal to be used for manipulating the DTV 1 and causes a transmitter 25 to send it to the outside. When the receiving section 118 receives the transmitted manipulation signal, the DTV 1 performs prescribed processing corresponding to the received manipulation signal.

In the embodiment, a signal that is sent from the remote controller 2 in response pressing of one of the keys 21 will be called a key manipulation signal, a signal that is sent from the remote controller 2 in response to a finger movement on the touch pad 22 will be called a touch pad manipulation signal, and a signal that is sent from the remote controller 2 in response to pressing of the four-direction keys 23 will be called a four-direction key manipulation signal.

Next, the control section 156 of the DTV 1 will be described in detail.

Figure 4:
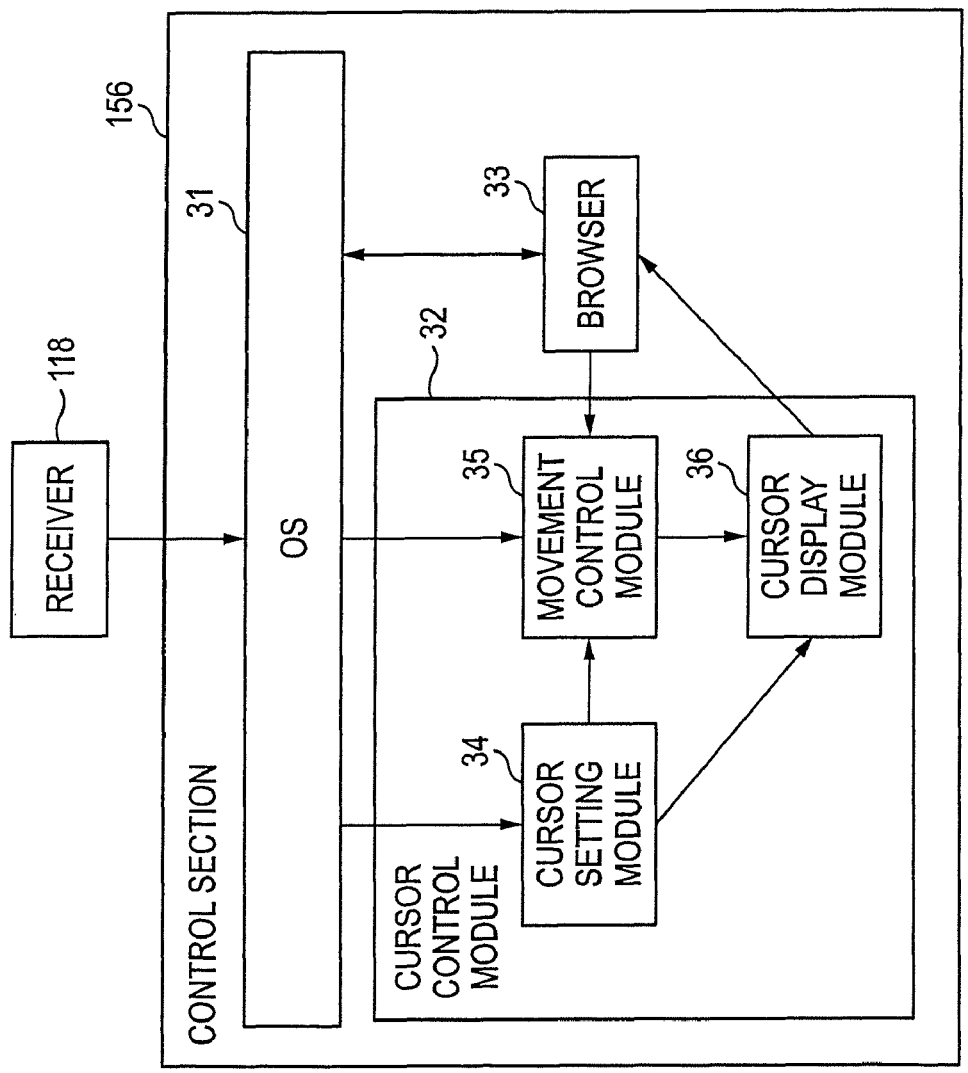
FIG. 4 is a functional block diagram of that part of the DTV according to the embodiment of the invention which relates to cursor control.

FIG. 4 is a functional block diagram of that part of the DTV 1 according to the embodiment which relates to cursor control. As shown in FIG. 4, the control section 156 is provided with an OS (operating system) 31, a cursor control module 32, and a browser 33. The cursor control module 32 includes a cursor setting module 34, a movement control module 35, and a cursor display module 36.

The OS 31 is software which provides basic functions, such as input/output functions (e.g., functions of handling an input from the receiving section 118 or the manipulation module 116 and an output to the display 120) and management of the HDD 180 and the RAM 158, to be used in common by many pieces of application software. The OS 31 also manages the entire computer system. The OS 31 has a function of supplying the cursor setting module 34, the movement control module 35, and the cursor display module 36 with a prescribed manipulation signal received form the remote controller 2.

The cursor control module 32 has a function of displaying a cursor on the display 120 of the DTV 1. When manipulating the remote controller 2, the user ends up manipulating the cursor which is displayed on the display 120 by the cursor control module 32 and can thereby give any of various manipulation instructions to the DTV 1.

The browser 33 has a function of displaying, on the display 120, a page acquired over the Internet . The browser 33 can enlarge or contract a displayed page (image) by changing the page display magnification. The browser 33 supplies display magnification information to the movement control module 35.

The cursor setting module 34 has a function of setting a cursor manipulation mode. In the embodiment, there are two cursor manipulation modes, that is, a touch pad manipulation mode and a four-direction key manipulation mode. The touch pad manipulation mode is a mode in which the cursor is moved based on a touch pad manipulation signal that is sent from the remote controller 2 in response to a manipulation of the touch pad 22. The four-direction key manipulation mode is a mode in which the cursor is moved based on a four-direction key manipulation signal that is sent from the remote controller 2 in response to a manipulation of one of the four-direction keys 23. The user can switch the cursor manipulation mode using the remote controller 2. When the cursor manipulation mode is switched in response to a manipulation signal that is received via the OS 31, the cursor setting module 34 holds information indicating the cursor manipulation mode and supplies it to the movement control module 35 and the cursor display module 36.

The movement control module 35 has a function of controlling the movement distance of the displayed cursor based on a touch pad manipulation signal or a four-direction key manipulation signal that is received via the OS 31. The movement control module 35 selects a manipulation signal to be employed based on cursor manipulation mode information that is received from the cursor setting module 34. That is, the movement control module 35 determines a cursor movement distance based on a touch pad manipulation signal (disregards a four-direction key manipulation signal even if it is received) if the cursor manipulation mode is the touch pad manipulation mode. Conversely, the movement control module 35 determines a cursor movement distance based on a four-direction key manipulation signal (disregards a touch pad manipulation signal even if it is received) if the cursor manipulation mode is the four-direction key manipulation mode.

The movement control module 35 acquires image display magnification information from the browser 33. The movement control module 35 controls the cursor movement distance based on display magnification information that is received from the browser 33, the kind of a received manipulation signal, the number of times of consecutive reception of the same signal, and other information. The control of the cursor movement distance will be described later in detail with reference to FIGS. 7-9.

The cursor display module 36 has a function of drawing a cursor. The cursor display module 36 holds information indicating a current position of the cursor, and the DTV 1 displays the cursor on the display 120 based on the cursor position information and an image signal the cursor thus drawn.

The cursor display module 36 changes the cursor display position based on cursor movement distance information that is received from the movement control module 35. The cursor display module 36 switches the cursor image to be displayed according to the cursor manipulation mode (touch pad manipulation mode or four-direction key manipulation mode). The cursor display module 36 also has a function of outputting information indicating a current position of the cursor (i.e., information of coordinates of a position pointed by the cursor on the screen) to the browser 33.

Next, how the cursor is displayed on the display 120 will be described with reference to FIGS. 5 and 6.

Figure 5:
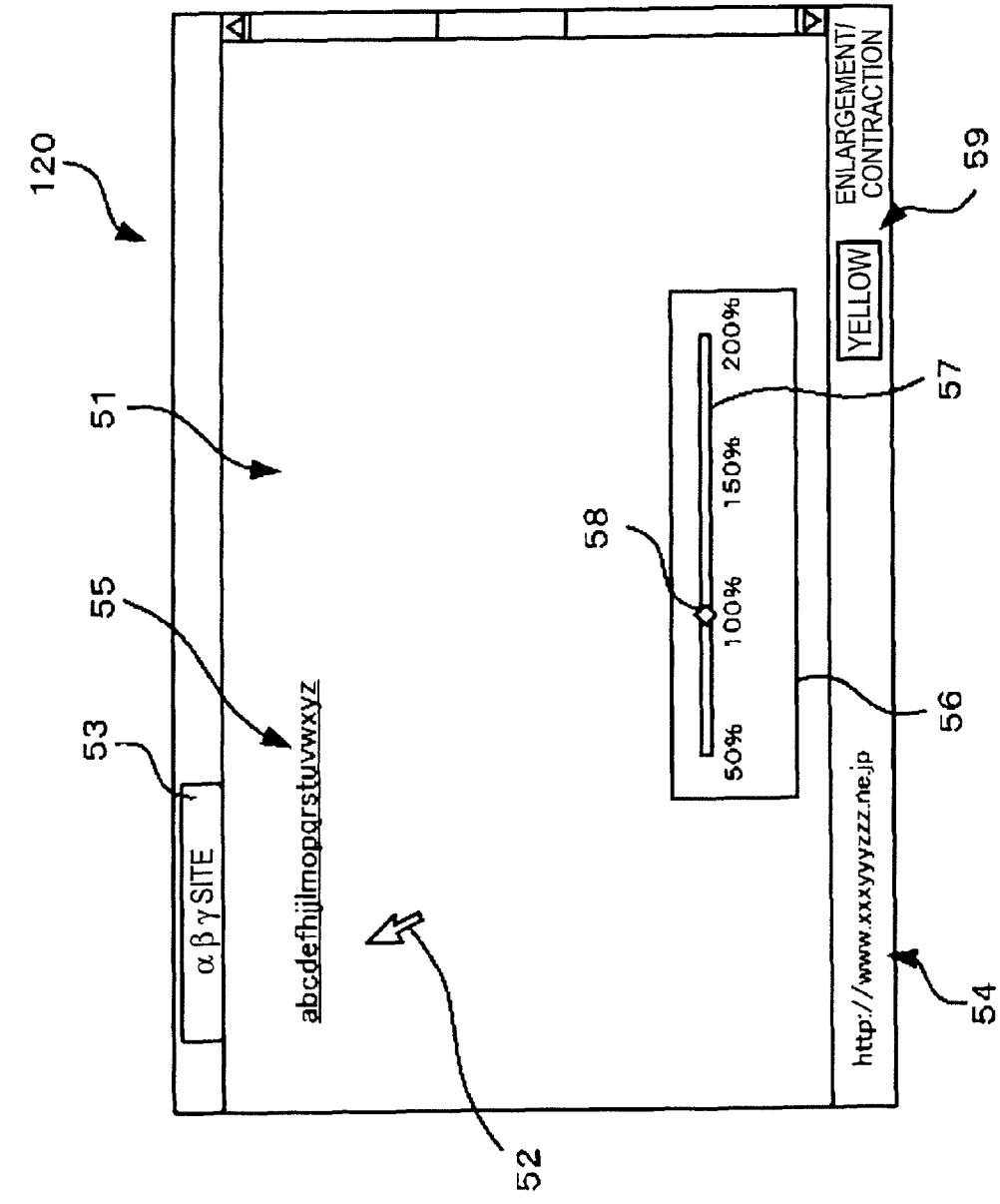
FIG. 5 is a schematic view showing an example display on a display which is made in a touch pad manipulation mode in the embodiment of the invention.

FIG. 5 schematically shows an example display on the display 120 which is made in the touch pad manipulation mode in the embodiment. As shown in FIG. 5, a page 51, a touch pad cursor 52, a page tab 53, a page URL 54, a link 55, a magnification setting display 56 (including a bar 57 and a slider 58), and a magnification setting calling display 59 are displayed on the display 120.

The page 51 is a Web page of a site that the DTV 1 has acquired over the Internet, and is drawn and displayed by the browser 33.

The touch pad cursor 52 is a cursor that is drawn and displayed by the cursor display module 36 of the cursor control module 32 when the cursor manipulation mode is the touch pad manipulation mode.

The page tab 53 shows a title of the displayed page 51.

The page URL 54 is a URL (uniform resource locator) of the displayed page 51.

The link 55 is displayed in the page 51. The user can jump to the page of the link 55 by selecting the link 55 using the cursor 52.

The magnification setting display 56 is a display window (GUI) to be used for setting a magnification with which the browser 33 displays the page 51. The user can enlarge or contract the page 51 by manipulating the remote controller 2 while referring to the magnification setting display 56. The magnification setting display 56 includes the bar 57 and the slider 58. The user can change the display magnification of the page 51 by moving the slider 58 along the bar 57 using the remote controller 2. In the state of FIG. 5, the slider 58 is located at a 100% position on the bar 57 and hence the page 51 is displayed with the same size as provided by a page provider. The page 51 is contracted by moving the slider 58 leftward along the bar 57 using the leftward key of the four-direction keys 23, and is enlarged by moving the slider 58 rightward along the bar 57 using the rightward key of the four-direction keys 23. In this manner, the slider 58 can be moved by manipulating the four-direction keys 23 of the remote controller 2. The user can thus set a display magnification freely.

The magnification setting calling display 59 is a display that indicates how to manipulate the remote controller 2 to call the manipulation setting display 56. In the embodiment, the manipulation setting display 56 is called by pressing the yellow key of the color keys of the keys 21 of the remote controller 2. The user can set a magnification of the page 51 (i.e., enlarge or contract the page 51) by calling the manipulation setting display 56 by pressing the yellow key. This display magnification setting is realized by a function of the browser 33.

Figure 6:
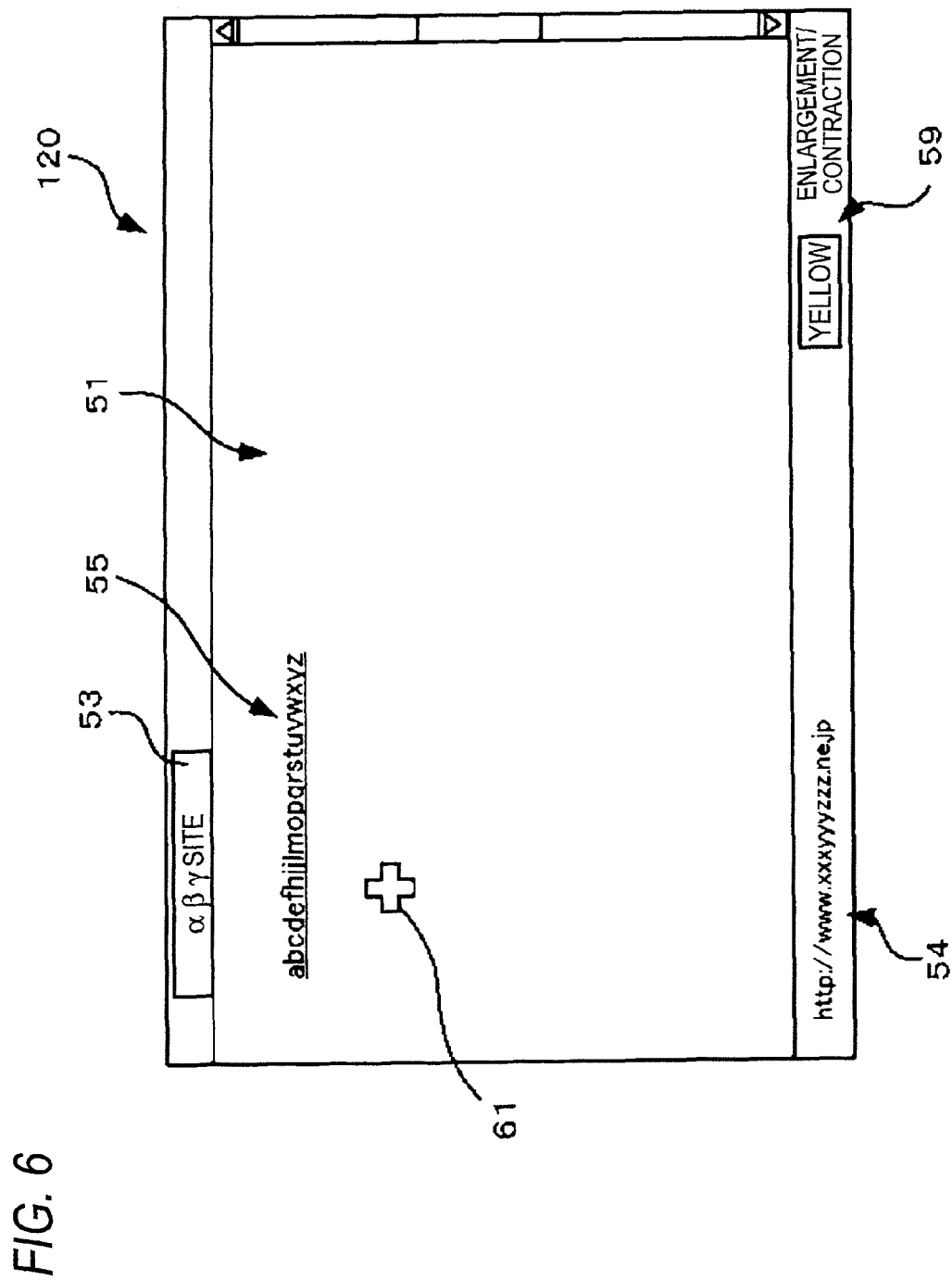
FIG. 6 is a schematic view showing an example display on the display which is made in a four-direction key manipulation mode in the embodiment of the invention.

FIG. 6 schematically shows an example display on the display 120 which is made in the four-direction key manipulation mode in the embodiment. As shown in FIG. 6, a page 51, a page tab 53, a page URL 54, a link 55, a magnification setting calling display 59, and a four-direction key cursor 61 are displayed on the display 120. FIG. 6 shows a state that a manipulation setting display 56 is not displayed on the display 120.

Whereas the touch pad cursor 52 is displayed on the display 120 in the touch pad manipulation mode, in the four-direction key display mode the four-direction key cursor 61 is displayed instead of the touch pad cursor 52. The four-direction key cursor 61 is a cursor that is drawn by the cursor display module 36 in the four-direction key manipulation mode.

The cursor manipulation mode can be switched by manipulating a prescribed key of the remote controller 2 even in a state that the page 51 is being displayed by the browser 33. The cursor design is also switched when the cursor manipulation mode is switched.

In the embodiment, the cursor manipulation mode dictates which of a touch pad manipulation signal and a four-direction key manipulation signal should be employed to move the cursor. Since as shown in FIGS. 5 and 6 the cursor design is switched according to the cursor manipulation mode, the user can intuitively recognize, merely by looking at the displayed cursor, which of the touch pad 22 and the four-direction keys 23 should be manipulated.

Furthermore, in the embodiment, the touch pad 22 and the four-direction keys 23 are integrated together in the remote controller 2 (i.e., the four-direction keys 23 can be manipulated by pressing down the touch pad 22). Therefore, a detection signal maybe output from the touch pad 22 when the user tries to manipulate (press) one of the four-direction keys 23, and one of the four-direction keys 23 may be manipulated when the user tries to manipulate the touch pad 22. The probability of occurrence of an erroneous manipulation of the remote controller 2 by the user can be reduced by employing the cursor manipulation mode and thereby using only one of a touch pad manipulation signal and a four-direction key manipulation signal. It is noted that the above type of manipulation error may occur also in a case that the touch pad 22 and the four-direction keys 23 are disposed close to each other in a remote controller.

Next, a relationship between the movement distance of the four-direction key cursor 61 and the four-direction key signal that is input in the four-direction key manipulation mode.

FIG. 7 is a table showing an example relationship between the movement distance of the four-direction key cursor 61 and the four-direction key signal which is received in the four-direction key manipulation mode in the embodiment.

The remote controller control section 24 of the remote controller 2 receives a detection signal from each of the various keys provided in the remote controller 2, and sends a corresponding manipulation signal via the transmitting section 25 based on the received detection signal.

When a finger is moved on the surface of the touch pad 22, the touch pad 22 inputs coordinate information of each contact position on the surface of the touch pad 22 to the remote controller control section 24. The remote controller control section 24 detects coordinate variations in each prescribed time, and sends the detected coordinate variations to the outside via the transmitting section 25 as a touch pad manipulation signal for cursor movement manipulation.

When one of the four-direction keys 23 is pressed, the four-direction keys 23 input, to the remote controller control section 24, a detection signal indicating what direction key of the four-direction keys 23 has been pressed. While one of the four-direction keys 23 is being pressed, the remote controller control section 24 sends pieces of information each indicating the direction of the one of the four-direction keys 23 to the outside via the transmitting section 25 as four-direction key manipulation signals for cursor movement manipulation. The remote controller control section 24 sends each such manipulation signal every 100 ms.

In the embodiment, there are three kinds of four-direction key manipulation signals that are sent from the remote controller 2. The DTV 1 controls the cursor movement distance on the screen according to the kind of a received four-direction key manipulation signal. The three kinds of four-direction key manipulation signals are a one-shot signal, a long-press signal, and a last long-press signal, which will be described below.

The one-shot signal is a signal that is sent when one of the four-direction keys 23 has been pressed for a time that is shorter than a prescribed time (not a long press). This signal contains information indicating which of the four-direction keys 23 located at the top, bottom, left, and right positions, respectively, is being pressed.

The long-press signal is a signal that is sent every time one of the four-direction keys 23 has been pressed for a time that is longer than or equal to the prescribed time. The long-press signal contains, in addition to information indicating which of the four-direction keys 23 located at the top, bottom, left, and right positions, respectively, is being pressed, long-press information indicating that the one of the four-direction keys 23 has been pressed continuously for a time that is longer than or equal to the prescribed time. As described above, the long-press signal is sent every 100 ms.

The last long-press signal is a signal that is sent last when a long press of one of the four-direction keys 23 has finished. The last long-press signal contains, in addition to information indicating which of the four-direction keys 23 located at the top, bottom, left, and right positions, respectively, is being pressed, information indicating that this signal is a signal that is sent last in connection with the long press.

The remote controller control section 24 sends one of the three kinds of manipulation signals according to a time during which a detection signal of one of the four-direction keys 23 is input continuously. The detection signal that is input from the four-direction keys 23 to the remote controller control section 24 indicates only a direction, that is, contains no information relating to a cursor movement distance. Therefore, in the embodiment, the remote controller control section 24 sends one of the three kinds of manipulation signals depending on the continuous pressing time of one of the four-direction keys 23. And the cursor movement distance is controlled according to the kind of a received manipulation signal.

When the DTV 1 receives such a manipulation signal, the movement control module 35 controls the movement distance of the four-direction key cursor 61 according to the kind of the received manipulation signal. For example, as shown in FIG. 7, when a one-shot signal is received, the movement control module 35 moves the four-direction key cursor 61 by a 10-pixel distance in the direction of the pressed one of the four-direction keys 23. When three or less long-press signals are received consecutively, the movement control module 35 moves the four-direction key cursor 61 by a 20-pixel distance for each long-press signal. When four or more long-press signals are received consecutively, the movement control module 35 moves the four-direction key cursor 61 by a 40-pixel distance for each long-press signal. When a last long-press signal is received, the movement control module 35 moves the four-direction key cursor 61 by a 10-pixel distance in the direction of the pressed one of the four-direction keys 23.

With the above configuration, when the user wants to move the four-direction key cursor 61 a long distance on the display 120, the user can increase the movement distance of the four-direction key cursor 61 by pressing one of the four-direction keys 23 for a long time. The convenience of the user is thus enhanced.

There may occur a case that depending on the relationship between the processing speeds of the remote controller 2 and the DTV 1 a long response time is taken from pressing of one of the four-direction keys 23 by the user to movement of the four-direction key cursor 61. In this case, even if the user performs a long press on one of the four-direction keys 23 and releases the finger when the cursor 61 has reached a position that is close to a target position, the cursor 61 might stop after passing the target position due to the slow response speed. In the embodiment, since the movement distance of the four-direction key cursor 61 for a last long-press signal is set short, the above-described problem that the cursor 61 is moved excessively in response to a long press can be solved.

In the above-described manner, the movement control module 35 controls the movement distance of the four-direction key cursor 61 according to the kind of a received signal. Next, how the four-direction key cursor 61 is moved on the display 120 will be described.

Figure 8:
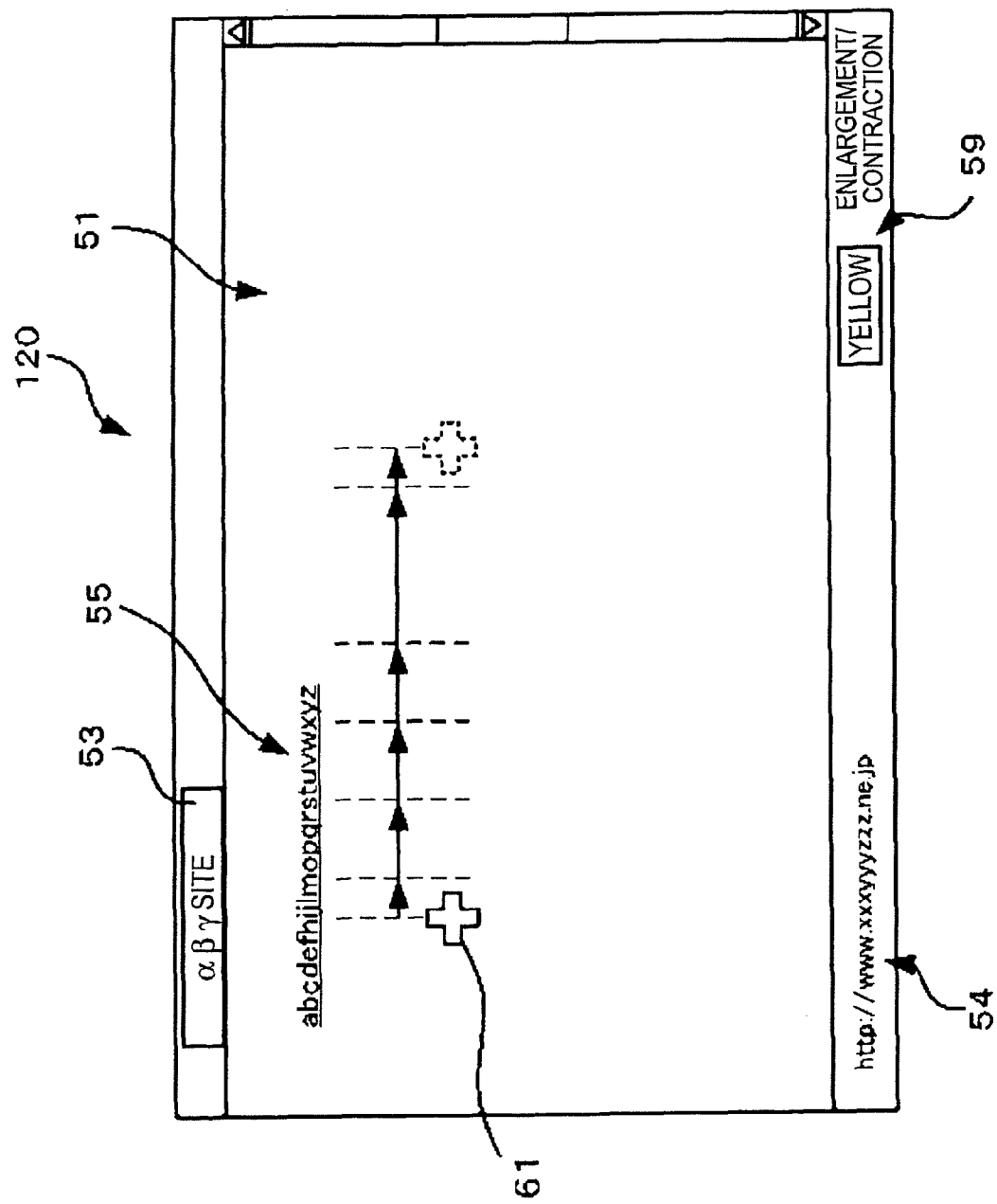
FIG. 8 is a view showing an example manner of movement of the four-direction key cursor in the embodiment of the invention.

FIG. 8 shows an example manner of movement of the four-direction key cursor 61 in the embodiment.

FIG. 8 shows how the four-direction key cursor 61 is moved according to the relationship of FIG. 7 as one of the four-direction keys 23 of the remote controller 2 is pressed for a certain time (long press).

In this example, the movement control module 35 receives four-direction key manipulation signals of the rightward key of the four-direction keys 23, that is, it receives a one-shot signal first, then four consecutive long-press signals, and finally a last long-press signal. When receiving the first, one-shot signal, the movement control module 35 instructs the cursor display module 36 to move the four-direction key cursor 61 a 10-pixel distance rightward. Then, in response to the three long-press signals, the movement control module 35 instructs the cursor display module 36 to move the four-direction key cursor 61 rightward three times by a 20-pixel distance each time. Then, since the movement control module 35 receives the four long-press signal consecutively in total, the movement control module 35 instructs the cursor display module 36 to move the four-direction key cursor 61 a 40-pixel distance rightward. Finally, in response to the last long-press signal, the movement control module 35 instructs the cursor display module 36 to move the four-direction key cursor 61 a 10-pixel distance rightward. The cursor display module 36 moves the displayed four-direction key cursor 61 according to the received instructions.

As described above, the browser 33 can enlarge or contract the page 51 by changing its display magnification according to a manipulation input made by the user through the magnification setting display 56. Next, a description will be made of how the four-direction key cursor 61 is moved in the case where the page 51 has been enlarged.

Figure 9A:
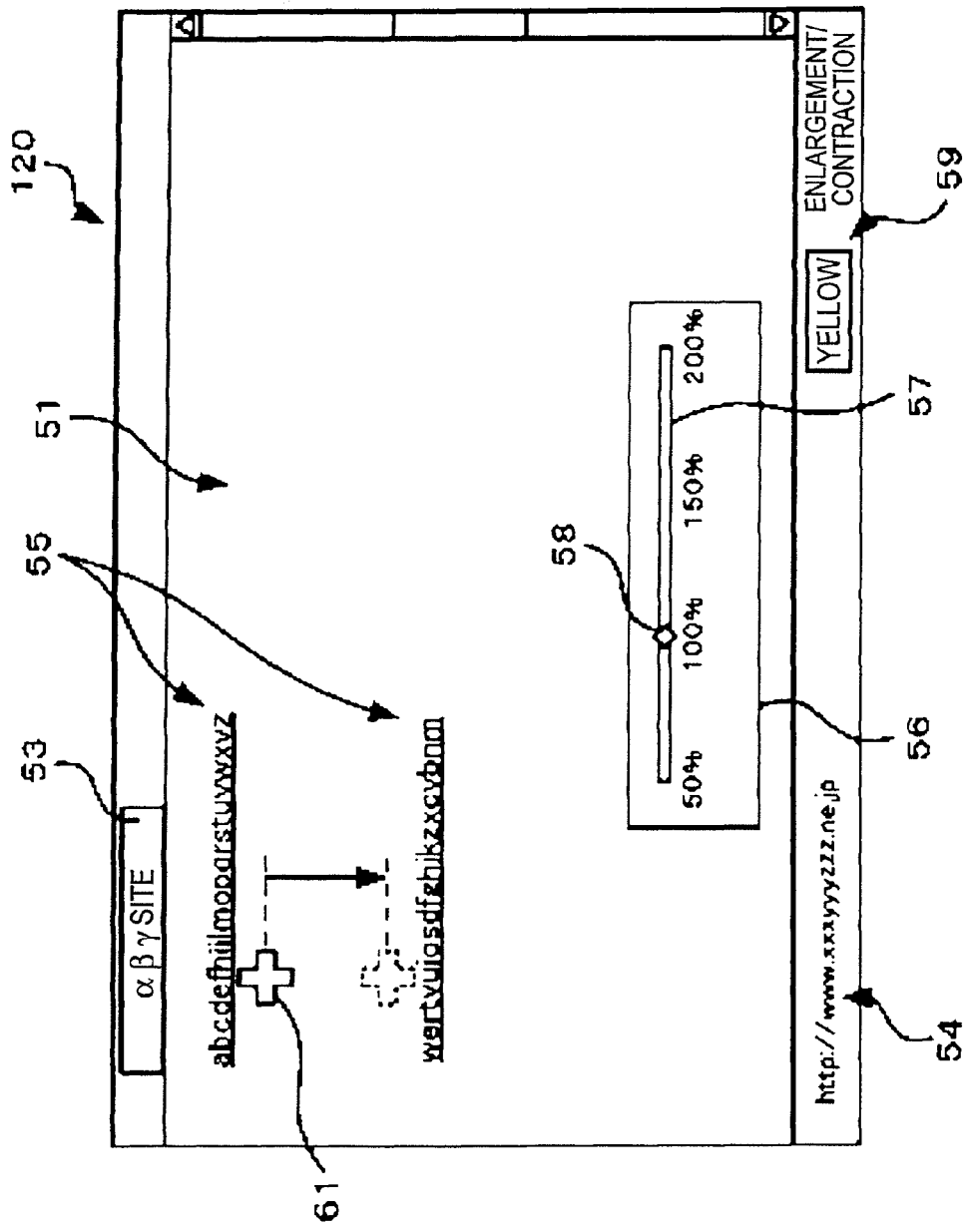
FIGS. 9A and 9B are views showing example manners of movement of the four-direction key cursor with a change of the page display magnification in the embodiment of the invention.
Figure 9B:
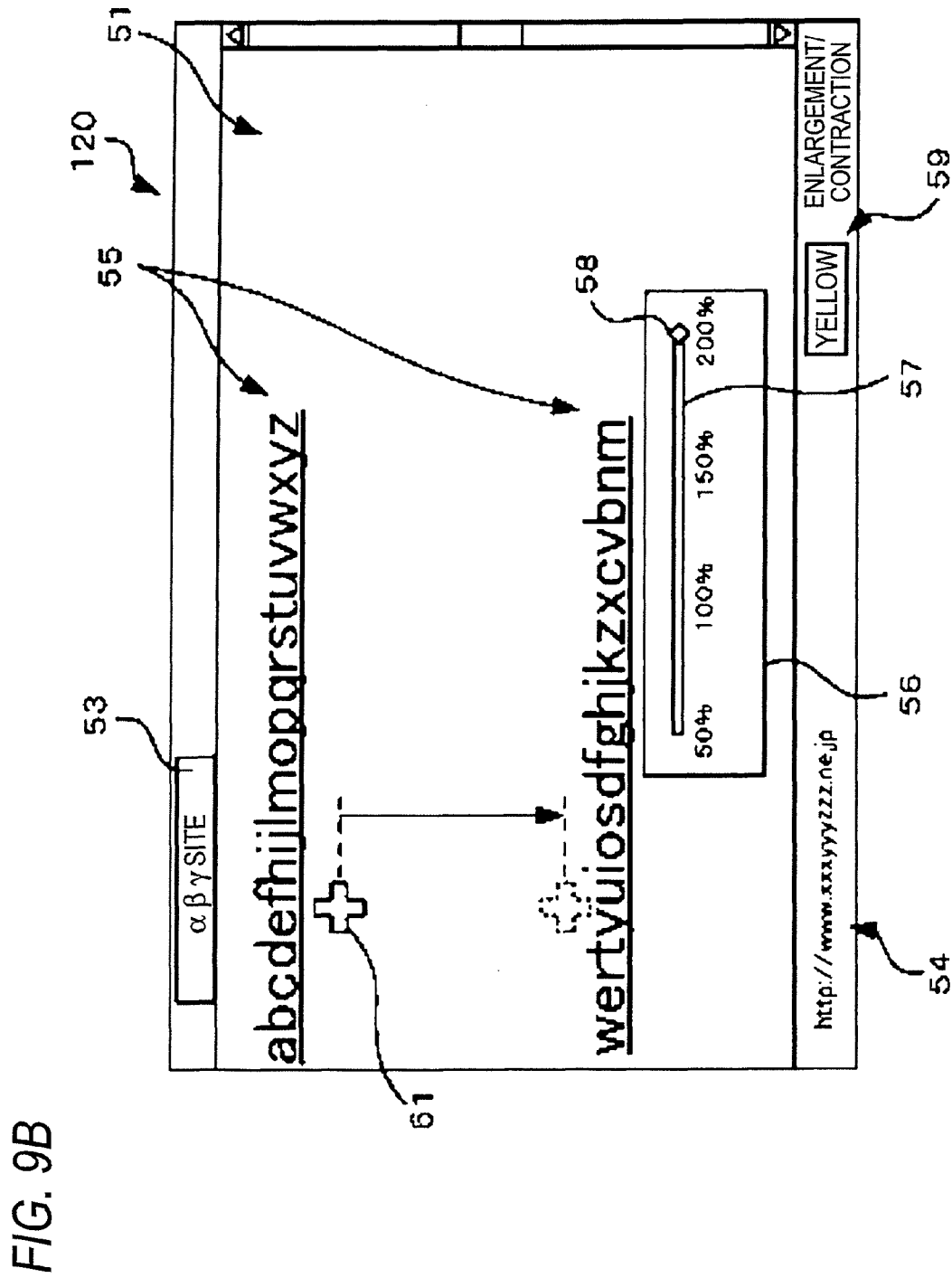

FIGS. 9A and 9B show example manners of movement of the four-direction key cursor 61 with a change of the display magnification of the page 51.

FIG. 9A shows how the four-direction key cursor 61 is moved (a movement distance) when one of the four-direction keys 23 is pressed for a time t in a state that the display magnification is 100%. FIG. 9B shows how the four-direction key cursor 61 is moved (a movement distance) when the one of the four-direction keys 23 is pressed for the same time t as in the case of FIG. 9A in a state that the display magnification is 200%.

The user can set the display magnification of the page 51 using the magnification setting display 56. FIGS. 9A and 9B show that the slider 58 has been manipulated so as to be located at the positions "100%" and "200%," respectively. Accordingly, in FIG. 9A, the size of the page 51 is set to the one set by the page provider that corresponds to the display magnification 100%. In FIG. 9B, the size of the page 51 is set to the one corresponding to the display magnification 200% that is two times the display size set by the page provider. That is, the page 51 (and the links 55 displayed in the page 51) in FIG. 9B is displayed with the magnification that is two times the magnification employed in FIG. 9A; that is, the page 51 in FIG. 9B is enlarged by a factor of 2.

Although the one of the four-direction keys 23 is pressed for the same time t in both cases of FIGS. 9A and 9B, in the case of FIG. 9B the four-direction key cursor 61 is moved a distance that is two times a distance it is moved in the case of FIG. 9A. In this manner, in the embodiment, the movement control module 35 controls the movement distance of the four-direction key cursor 61 according to the image display magnification of the browser 33. That is, the larger the display magnification of the page 51 of the browser 33 is, the longer the movement control module 35 sets the movement distance of the four-direction key cursor 61.

For example, if the movement distance of the four-direction key cursor 61 were not changed when the display magnification is set larger, the movement distance of the four-direction key cursor 61 would be too short for the size of the entire page 51 and it would take more time for the user to move the four-direction key cursor 61 the same distance in the page 51. The movement time can be shortened by increasing the cursor movement distance when the image display magnification is set larger.

Conversely, if the movement distance of the four-direction key cursor 61 were not changed when the display magnification is set smaller, the movement distance of the four-direction key cursor 61 would be too long for the size of the entire page 51 and the four-direction key cursor 61 would likely pass a target position, which is inconvenient to the user. The probability that the four-direction key cursor 61 passes a target position can be lowered by decreasing the cursor movement distance when the image display magnification is set smaller. This makes the four-direction key cursor 61 easier to use.

Furthermore, in the embodiment, when the image display magnification is changed, the movement control module 35 controls the movement distance of the four-direction key cursor 61 so that it is changed by a factor that is equal to a magnification changing ratio. For example, when the display magnification is changed from 100% to 200% as in the case of FIGS. 9A and 9B (the magnification is doubled), the movement control module 35 sets the movement distance of the four-direction key cursor 61 to two times that corresponding to the display magnification 100%. When the browser 33 has changed (halved) the display magnification of the page 51 from 100% to 50% (the magnification is halved), the movement control module 35 controls the movement distance of the four-direction key cursor 61 so that it is made ½ of that corresponding to the display magnification 100%. In this manner, when a displayed image is enlarged or contracted, the movement control module 35 changes the cursor movement distance by a factor that is equal to a magnification changing ratio. As a result, even when the image display magnification is changed, the user can manipulate the four-direction key cursor 61 while feeling the movement distance in the same way as before the magnification change.

When receiving information indicating a change of the display magnification from the browser 33, the movement control module 35 changes the movement distance values in the relationship shown in FIG. 7. For example, when the display magnification is increased by a factor of 2, the movement distance values are changed to 20 pixels, 40 pixels, 80 pixels, and 20 pixels for the one-shot signal, long-press signal (to a third one), long-press signal (from a fourth one), and last long-press signal, respectively. New movement distance values may be either calculated by the movement control module 35 or determined by the movement control module 35 according to a table which correlates movement distance values with magnification values when it is informed of a new magnification.

Although in the embodiment the size of the four-direction key cursor 61 is not changed according to the display magnification of the browser 33, it may also be changed according to the display magnification like the movement distance is. In this case, the browser 33 also informs the cursor display module 36 of a change of the display magnification and the cursor display module 36 draws the four-direction key cursor 61 so as to enlarge or contract it by a factor that is equal to a display magnification changing ratio. This causes the user to feel that the entire image including the four-direction key cursor 61 has been enlarged or contracted.

Figure 10:
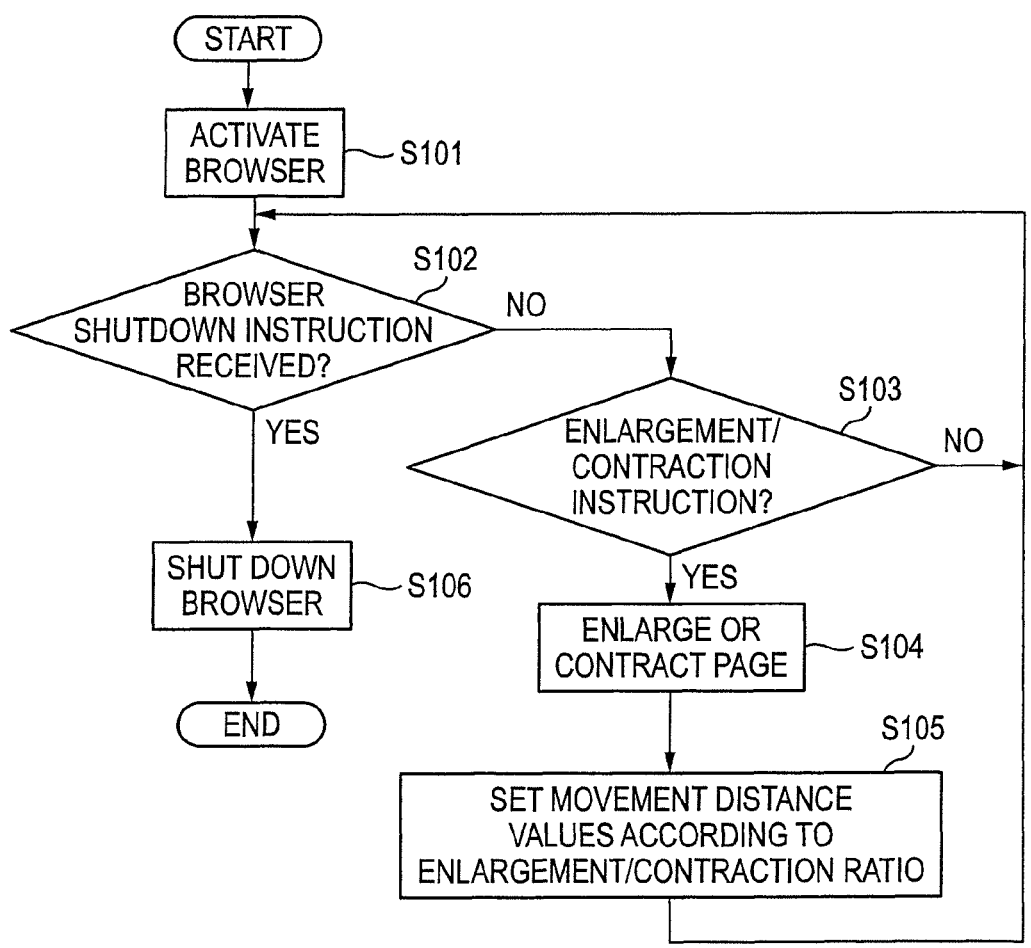
FIG. 10 is a flowchart of an example browser image display magnification changing and cursor movement distance setting process which is executed by the DTV according to the embodiment of the invention.

Next, processes that are executed by the DTV 1 will be described. FIG. 10 is a flowchart of an example browser image display magnification changing and cursor movement distance setting process which is executed by the DTV 1 according to the embodiment.

First, the browser 33 is activated at step S101. The cursor control module 32 is activated at the same time.

At step S102, it is judged whether the browser 33 has received a shutdown instruction (i.e., an instruction to finish the operation of the browser 33) has been received or not. If the browser 33 has not received a shutdown instruction (S102: no), at step S103 the browser 33 judges whether or not an instruction to enlarge or contact the page 51 (i.e., an instruction to change the display magnification) has been received from the user.

If an instruction to enlarge or contact the page 51 has not been received from the user (S103: no), the process returns to step S102.

If an instruction to enlarge or contact the page 51 has been received from the user (S103: yes), the process moves to step S104, where the browser 33 performs processing of enlarging or contracting the page 51 (changing the display magnification). At the same time, the browser 33 informs the movement control module 35 of an enlargement/contraction ratio.

Informed of the enlargement/contraction ratio, at step S105 the movement control module 35 performs processing of setting movement distance values of the four-direction key cursor 61. More specifically, the movement control module 35 sets a new relationship between the four-direction key manipulation signal and the cursor movement distance according to the enlargement/contraction ratio, that is, changes the movement distance values in the relationship of FIG. 7.

Upon completion of the execution of step S105, the process returns to step S102.

If it is judged at step S102 that the browser 33 has received a shutdown instruction (S102: yes), the browser 33 as well as the cursor control module 32 is shut down. Then, the process is finished.

Next, a cursor display/moving process will be described.

Figure 11:
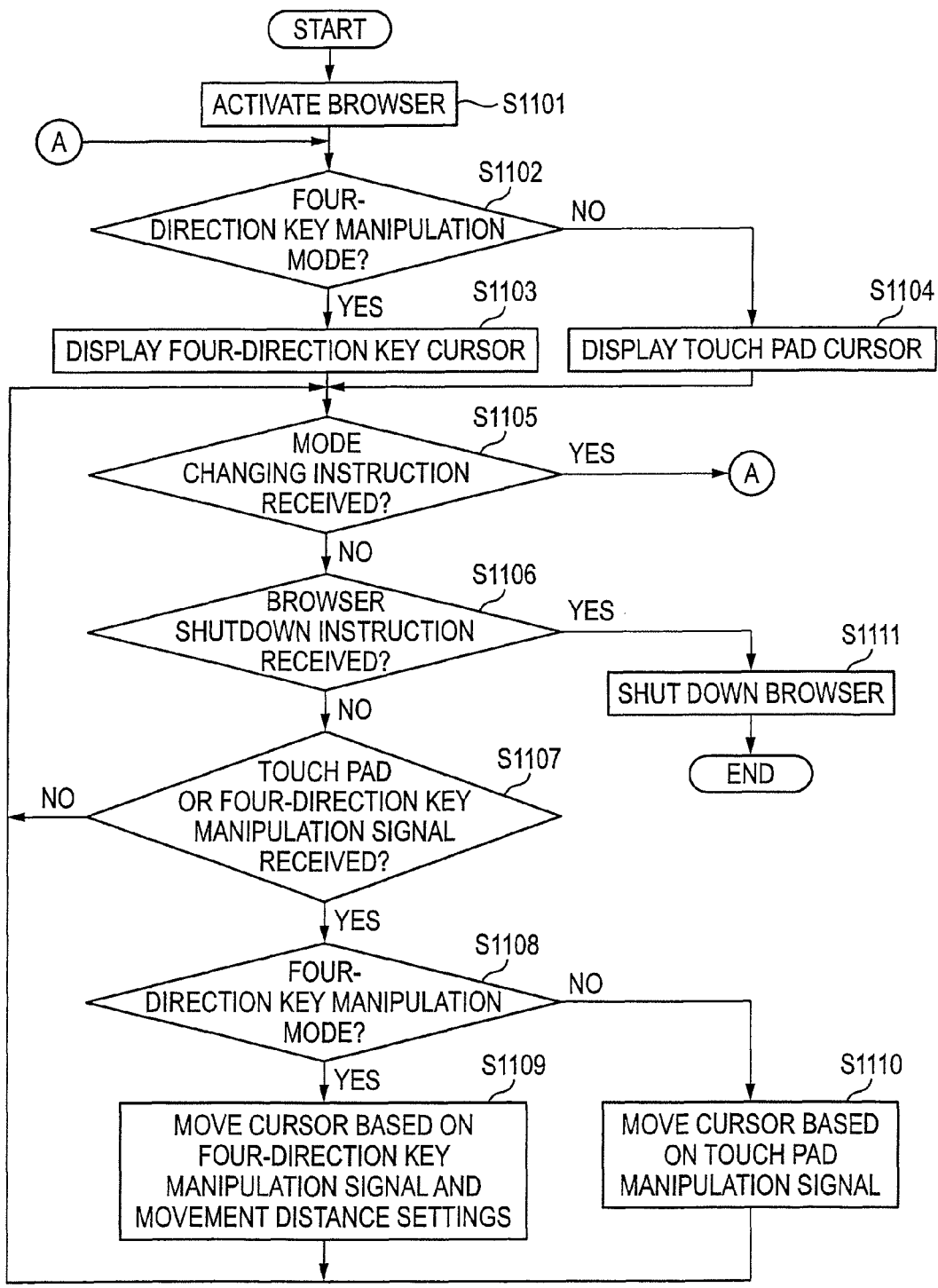
FIG. 11 is a flowchart of an example cursor display/moving process which is executed by the DTV according to the embodiment of the invention.

FIG. 11 is a flowchart of an example cursor display/moving process which is executed by the DTV 1 according to the embodiment.

First, the browser 33 is activated at step S1101. The cursor control module 32 is activated at the same time.

The cursor setting module 34 sets the cursor manipulation mode based on information indicating a cursor manipulation mode that was employed when the browser 33 was deactivated last time, the information being held by the cursor setting module 34 itself.

If the cursor manipulation mode is the four-direction key manipulation mode (S1102: yes), at step S1103 the cursor setting module 34 outputs information to the effect that the cursor manipulation mode is set to the four-direction key manipulation mode to the movement control module 35 and the cursor display module 36. The cursor display module 36 draws and displays the four-direction key cursor 61 based on the received information.

If the cursor manipulation mode is not the four-direction key manipulation mode (S1102: no; touch pad manipulation mode), at step S1104 the cursor setting module 34 outputs information to the effect that the cursor manipulation mode is set to the touch pad manipulation mode to the movement control module 35 and the cursor display module 36. The cursor display module 36 draws and displays the touch pad cursor 52 based on the received information.

Upon completion of the execution of step S1103 or S1104, at step S1105 the cursor setting module 34 judges whether or not a cursor manipulation mode changing instruction has been received from the user. If a cursor manipulation mode changing instruction has been received from the user (S1105: yes), the process returns to step S1102.

If a cursor manipulation mode changing instruction has not been received (S1105: no), at step S1106 the browser 33 judges whether or not it has received an instruction to shut down itself.

If the browser 33 has not received a shutdown instruction (S1106: no), at step S1107 the movement control module 35 judges whether or not it has received a touch pad manipulation signal or a four-direction key manipulation signal from the remote controller 2.

If the movement control module 35 judges that it has received a touch pad manipulation signal or a four-direction key manipulation signal from the remote controller 2 (S1107: yes), at step S1108 the movement control module 35 judges whether or not the cursor manipulation mode is set to the four-direction key manipulation mode.

If judging that the cursor manipulation mode is set to the four-direction key manipulation mode (S1108: yes), at step S1109 the movement control module 35 determines a cursor movement distance based on the movement distance settings and the four-direction key manipulation signal and supplies movement distance information (including a movement direction) to the cursor display module 36. Based on the received movement distance information, the cursor display module 36 draws and displays the four-direction key cursor 61 so that it is moved that movement distance.

If judging that the cursor manipulation mode is not set to the four-direction key manipulation mode (S1108: no; touch pad manipulation mode), at step S1110 the movement control module 35 determines a movement distance of the touch pad cursor 52 based on the touch pad key manipulation signal. The movement control module 35 draws and displays the touch pad cursor 52 so that it is moved that movement distance.

If the movement control module 35 judges that it has not received a touch pad manipulation signal or a four-direction key manipulation signal (S1107: no) or if the execution of step S1109 or step S1110 has completed, the process returns to step S1105.

If the browser 33 judges that it has received a browser shutdown instruction (S1106: yes), the browser 33 shuts down itself. The cursor control module 32 is shut down at the same time. The process is thus finished.

In the embodiment, the movement distance of the four-direction key cursor 61 is controlled according to a four-direction key manipulation signal sent from the remote controller 2 and an enlargement/contraction ratio of the browser 33. Unlike a pointing device such as the touch pad 22, the four-direction keys 23 of the remote controller 2 allow the user to input only information relating to a direction (i.e., the user cannot input information relating to a movement distance) by a single manipulation. Therefore, when it is intended to move a cursor or the like using the four-direction keys 23, satisfactory results would be obtained if the user can input information relating to a movement distance. In view of this, the image display system 3 according to embodiment is configured so that the cursor movement distance can be controlled according to a four-direction key pressing time. However, even with this configuration, the movement distance cannot be changed in a short time. Therefore, when an image has been enlarged or contracted in which case it is desired to change the cursor movement distance to a large extent, the cursor movement distance is controlled according to an enlargement/contraction ratio. The cursor movement distance can thereby be changed in a short time. This feature of the embodiment is particularly useful in the case where the cursor is manipulated by using an input device, such as four-direction keys, that outputs only direction information first.

In the embodiment, the feature of changing the cursor movement distance in response to a change of the display magnification of the browser 33 is applied to the four-direction key manipulation signal. However, the invention is not limited to such a case. The movement distance may be changed for the touch pad manipulation signal.

With the DTV 1 according to the embodiment, the user can easily manipulate the cursor even when the image display magnification has been changed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a display configured to display an image including a browser and a page displayed on the browser;
    a display magnification changing module configured to change display magnification of the image of the page;
    a cursor display module configured to display a cursor;
    a receiver configured to receive a signal indicating a movement direction; and
    a cursor movement control module configured to move the cursor a first distance in the movement direction indicated by the received signal when the display is displaying the image of the page with a first display magnification, and configured to move the cursor a second distance that is longer than the first distance in the movement direction indicated by the received signal when the display is displaying the image of the page with a display magnification that is larger than the first display magnification, wherein when the display magnification changing module changes the display magnification by a first magnification changing ratio, the cursor movement control module controls movement distance of the cursor so that a ratio of a cursor movement distance when the signal is received after the display magnification change to a cursor movement distance when the signal was received before the display magnification change is equal to the first magnification changing ratio.

2. The electronic apparatus according to claim 1, wherein the cursor movement control module moves the cursor a third distance that is shorter than the first distance in the movement direction indicated by the received signal when the display is displaying the image of the page with a display magnification that is smaller than the first display magnification.

3. The electronic apparatus according to claim 1, wherein:
the receiver receives a first signal indicating the movement direction, receives a second signal indicating the movement direction after the first signal, and receives a third signal indicating the movement direction after the second signal; and
the cursor movement control module moves the cursor a fourth distance when receiving the first signal, moves the cursor a fifth distance that is longer than the fourth distance when receiving the second signal, and moves the cursor a sixth distance that is longer than the fifth distance when receiving the third signal.

4. The electronic apparatus according to claim 1, further comprising:
a switching module configured to switch between modes, wherein:
the receiver receives a signal containing direction information and distance information;
the cursor movement control module comprises:
a first moving module configured to move the cursor based on the received signal containing the direction information and the distance information; and
a second moving module configured to move the cursor based on the received signal indicating the movement direction; and
the switching module switches between a mode in which the first moving module moves the cursor and a mode in which the second moving module moves the cursor.

5. The electronic apparatus according to claim 4, wherein the cursor display module changes a shape of the cursor when the switching module switches between the modes.

6. The electronic apparatus according to claim 1, further comprising:
a broadcast signal receiver configured to receive a broadcast signal;
a tuner configured to tune in to the received broadcast signal; and
a video display configured to display video that is contained in the broadcast signal that is output from the tuner.

7. An image display system comprising:
a remote controller comprising:
a detector configured to detect pressing of a key for inputting a direction; and
a transmitter configured to send a signal indicating a movement direction according to the pressed key;
a display configured to display an image including a browser and a page displayed on the browser;
a display magnification changing module configured to change display magnification of the image of the page;
a cursor display module configured to display a cursor;
a receiver configured to receive the signal indicating the movement direction; and
a cursor movement control module configured to move the cursor a first distance in the movement direction indicated by the received signal when the display is displaying the image of the page with a first display magnification, and configured to move the cursor a second distance that is longer than the first distance in the movement direction indicated by the received signal when the display is displaying the image of the page with a display magnification that is larger than the first display magnification, wherein
when the display magnification changing module changes the display magnification by a first magnification changing ratio, the cursor movement control module controls movement distance of the cursor so that a ratio of a cursor movement distance when the signal is received after the display magnification change to a cursor movement distance when the signal was received before the display magnification change is equal to the first magnification changing ratio.

8. An image display method for displaying an image including a browser and a page displayed on the browser and a cursor on a display, comprising:
receiving a signal indicating a movement direction; and
moving the cursor a first distance in the movement direction indicated by the received signal when the image of the page is being displayed with a first display magnification, and moving the cursor a second distance that is longer than the first distance in the movement direction indicated by the received signal when the image of the page is being displayed with a display magnification that is larger than the first display magnification, wherein
when the display magnification by a first magnification changing ratio is changed, movement distance of the cursor is controlled so that a ratio of a cursor movement distance when the signal is received after the display magnification change to a cursor movement distance when the signal was received before the display magnification change is equal to the first magnification changing ratio.

* * * * *